(12) United States Patent
Yamashita

(10) Patent No.: US 8,069,552 B2
(45) Date of Patent: Dec. 6, 2011

(54) METHOD OF MANUFACTURING ROTOR MAGNET FOR MICRO ROTARY ELECTRIC MACHINE

(75) Inventor: Fumitoshi Yamashita, Kitasaku-gun (JP)

(73) Assignee: Minebea Co., Ltd., Kitasaku-Gun (JP)

( * ) Notice: Subject to any disclaimer, the term of this patent is extended or adjusted under 35 U.S.C. 154(b) by 0 days.

(21) Appl. No.: 12/461,509

(22) Filed: Aug. 13, 2009

(65) Prior Publication Data

US 2010/0043206 A1  Feb. 25, 2010

(30) Foreign Application Priority Data

Aug. 22, 2008  (JP) ................. 2008-214647

(51) Int. Cl.
  *H02K 15/10* (2006.01)
(52) U.S. Cl. ........... 29/598; 29/596; 29/607; 29/609; 310/156.38; 310/156.43; 310/40 MM
(58) Field of Classification Search ........... 29/596, 29/598, 607, 609; 310/156.38, 156.43, 40 MM
See application file for complete search history.

(56) References Cited

U.S. PATENT DOCUMENTS

| | | | |
|---|---|---|---|
| 4,597,938 A * | 7/1986 | Matsuura et al. | 419/23 |
| 5,676,998 A * | 10/1997 | Araki et al. | 427/132 |
| 5,677,579 A | 10/1997 | Dona et al. | |
| 6,706,124 B2 * | 3/2004 | Kanekiyo et al. | 148/302 |

FOREIGN PATENT DOCUMENTS

| | | |
|---|---|---|
| JP | A-9-23771 | 1/1997 |
| JP | A-9-501820 | 2/1997 |
| JP | A-11-288812 | 10/1999 |
| JP | A-2002-532047 | 9/2002 |
| JP | 2004356544 A * | 12/2004 |

OTHER PUBLICATIONS

Ohta et al., Mitsubishi Electric Corp. Technical Report, vol. 75, p. 703, 2001 (with partial translation).
Otah et al., *Mitsubishi Electric Corp. Technical Report*, vol. 75, pp. 703-708, 2001.
Raisigel et al., "Magnetic Planar Micro-Generator", 18$^{th}$ International Workshop on High Performance Magnets and their Applications, Annecy, France, pp. 942-944, Aug. 29-Sep. 2, 2004.

(Continued)

*Primary Examiner* — Derris Banks
*Assistant Examiner* — Azm Parvez
(74) *Attorney, Agent, or Firm* — Oliff & Berridge, PLC

(57) ABSTRACT

A method of manufacturing a rotor magnet for a micro rotary electric machine is provided which includes steps of: a process in which a plurality of thick films, each of which is made of nanocomposite texture composed of αFe and R-TM-B where R is either 10 to 20 atomic % Nd or 10 to 20 atomic % Pr, B is 5 to 20 atomic % and TM is either Fe or partly Co-substituted Fe with 0 to 16 atomic %, are formed into a laminated magnet including isotropic nano-crystalline texture which contains αFe and $R_2TM_{14}B$ and which has a remanence, Mr, of 0.95 T or more; and a process where the laminated magnet is multi-polar magnetized in-plane of the thick films.

2 Claims, 4 Drawing Sheets

OTHER PUBLICATIONS

Nakano et al., "Application of PLD-Made Nd-Fe-B Film Magnets", 18th International Workshop on High Performance Magnets and their Applications, Annecy, France, pp. 723-726, Aug. 29-Sep. 2, 2004.

Itoh, "Ultra-Small Electromagnetic Motors and Micro-Generators, and Their Application to Micromachines", *Journal of the Magnetics Society of Japan*, vol. 18, pp. 922-927, 1994.

Hinz et al., "High Performance NdFeB Magnets with a Thickness of Some 100 μm for MEMS Applications", 18th International Workshop on High Performance Magnets and their Applications, Annecy, France, pp. 76-83, Aug. 29-Sep. 2, 2004.

Delamare et al., "Magnetic Down-Scaling Laws, Micro-Magnets and Applications of Magnetic Micro-Actuators (MAGMAS)", 18th International Workshop on High Performance Magnets and their Applications, Annecy, France, pp. 767-778, Aug. 29-Sep. 2, 2004.

Topfer et al., "NdFeB Thick Films for MAGMAS Applications", 18th International Workshop on High Performance Magnets and their Applications, Annecy, France, pp. 942-944, Aug.-Sep. 2, 2004.

Yamashita, "Recent Examples of Efficient Small Rare-Earth Magnet Motors", Materials for the 143rd Workshop of the Applied Magnetics Society of Japan, Surugadai Kinenkan of Chuo University, 2005.

Komura et al., "Fine Pole-Pitch Magnetizing Method for Nd-Fe-B Isotropic Magnet with High Coercivity", *Journal of Applied Physics*, vol. 101, 09K104, 2007.

* cited by examiner

METHOD OF MANUFACTURING ROTOR MAGNET FOR MICRO ROTARY ELECTRIC MACHINE

BACKGROUND OF THE INVENTION

1. Field of the Invention

The present invention relates to a method of manufacturing a rotor magnet for a micro rotary electric machine, and more particularly to a method of manufacturing a rotor magnet including a predetermined number of thick films layered on one another, which include magnetically isotropic nano-crystalline texture composed of a high saturation magnetized αFe phase and a high coercive $R_2TM_{14}B$ phase, and which are multi-polar magnetized in-plane, to thereby provide a radial gap type micro rotary electric machine adapted to improve a high mechanical output power.

2. Description of the Related Art

A rotary electric machine for application field, for example, information and telecommunication devices has been commercially produced with its volume reduced to about 100 mm³ and is widely used. Such a rotary electric machine, when further miniaturized successfully, is expected to create a market for a motor adapted to output dynamic power or a generator adapted to produce electric power as a magnetic device in the so-called Power MEMS (Power micro-electromechanical system) field for new era.

Patent Document 1, for example, discloses a radial gap type brushless DC motor (RG-BLM) with an outer diameter of 1 mm or less and an axial length of 2 mm or less, which includes a hollow circular cylinder having a conductive cylindrical wall with slots and functioning as an excitation winding, and which is applied to an intravascular ultrasonography system. Also, Patent Document 2 discloses a fluid-cooled RG-BLM which has an outer diameter of 8 mm or less, and accordingly can be introduced into a vascular system of a body to thereby drive a blood pump located in the body, and in which an excitation winding is molded by resin containing $Al_2O_3$ thereby enhancing heat dissipation performance thus enabling achievement of an output of 5 W at 30,000 rpm.

As an example of a micro rotary electric machine as described above, a brushless DC motor is known which has a volume of 4 mm³ with an outer diameter of 1.6 mm and an axial length of 2 mm wherein a one pole-pair rotor having an outer diameter of 0.76 mm and including an $Nd_2Fe_{14}B$ sintered magnet produced by electric discharge machining is coupled to a stator (refer to Non-Patent Document 1). Also known are a brushless DC motor with a volume of 62 mm³ (an outer diameter of 6 mm and an axial length of 2.2 mm) proposed by H. Raisigel (refer to Non-Patent Document 2), further a brushless DC motor with a volume of 20 mm³ (an outer diameter of 5 mm and an axial length of 1 mm) proposed by M. Nakano (refer to Non-Patent Document 3), and still further a brushless DC motor with a volume of 0.6 mm³ (an outer diameter of 0.8 mm and an axial length of 1.2 mm) proposed by T. Ito (refer to Non-Patent Document 4). The micro rotary electric machines described above undergo a significant decrease in torque due to the volume reduction according to the scaling law. However, since the mechanical output power P (W) is obtained by a product of: a constant number k=0.1047 ($=\pi30$); a revolution number N (r.p.m.); and a torque T (Nm), the decrease of the output P of a rotary electric machine resulting from the volume reduction can be supplemented to some extent by an increased rotational speed.

Various proposals have been presented for rotor magnets for use in the micro rotary electric machines as described above. For example, D. Hinz, et al. introduce an $Nd_2Fe_{14}B$ system magnet with a thickness of 300 μm, which is die-upset at 750° C. and has a remanence, Mr,=1.25 T, a coercivity, HcJ,=1.06 MA/m, and a (BH)max=290 kJ/m³ (refer to Non-Patent Document 5). Also, J. Delamare, et al. represent that a torque of 0.001 mNm is generated by a motor which includes a rotor with an SmCo system magnet having eight pole-pairs and a stator disposed to oppose the rotor and which is driven at 100,000 rpm, or that an electric power of 1 W is produced by an electric generator which includes the above described rotor and stator and which is driven at 150,000 rpm (refer to Non-Patent Document 6). Further, Toepfer, T. Speliois, et al. report a so-called Power MEMS motor including a rotor with an $Nd_2Fe_{14}B$ bonded magnet which is screen-printed on an FeSi substrate with a diameter of 10 mm so as to have a thickness of 500 μm, and which has a remanence, Mr,=0.42 T, and a (BH)max=15.8 kJ/m³ (refer to Non-Patent Document 7). In terms of torque per volume of a micro rotary electric machine, a radial gap type has an advantage over an axial gap type (refer to Non-Patent Document 8). Accordingly, a rotor magnet must be multi-polar magnetized in the radial direction to thereby fully derive the magnetic potential inherently present in a material.

A general two-pole permanent magnetic field of, for example, a DC motor can be pulse-current magnetized using a solenoid coil so as to achieve a magnetizing field of 4 MA/m or more. In this connection, in order to enable a micro rotary electric machine to achieve a higher dense torque, it is preferred to increase the number of magnetic poles as seen in the eight pole-pair rotor of J. Delamare, et al (refer to Non-Patent Document 6). When a rotor magnet is designed to have four or more poles with an inter-pole distance of about 1.5 mm, it is usual to apply pulse-current magnetization using a magnetization yoke of 1 turn/coil. However, considering the durability of the magnetization yoke (conductor), the peak value of pulsed current, IP, is set at a current density of up to about 25 kA/mm² for the conductor. That is to say, if the inter-pole distance decreases, the conductor diameter is decreased, and consequently the peak value of pulsed current, IP, allowed is lowered. As a result, when the rotor magnet is further miniaturized and magnetized with an increased number of pole-pairs, saturation magnetization is inevitable thus making it difficult to fully derive the magnetic potential inherently present in a material.

H. Komura, et al. disclose a fine magnetization of a rotor magnet for use in such a micro rotary electric machine as described above, wherein a bonded magnet with an outer diameter of 2.6 mm, which includes an isotropic $Nd_2Fe_{14}B$ magnetic powder (Currie temperature Tc=320° C.) prepared from a melt-spinning and cured with an epoxy resin, and which has a remanence, Mr,=about 0.7 T, is put in a magnetic field system fabricated from a 2-17 type SmCo system sintered magnet, is heated up to Tc (320° C.) or higher, and then cooled in the magnetic field system, whereby the rotor magnet is magnetized with eight pole-pairs. The magnetization described above is said to have achieved a magnetic flux almost three times as high as the magnetic flux achieved by the usual pulse-current magnetization of 1 turn/coil (refer to Non-Patent Document 9).

As for a magnet which includes an isotropic nano-crystalline texture according to the present invention composed of αFe and $R_2TM_{14}Bs$, usually an R-TM-B molten alloy is melt-spun making an amorphous thin ribbon of αFe and R-TBM, and then the amorphous thin ribbon is treated with heat and is thereby crystallized. Material obtained by rapid solidification of a molten alloy is limited to a powdery substance, such as a melt-spun thin ribbon having a thickness of about 15 to 40 μm. Accordingly, the powdery substance must be consolidated into a specific bulk by some means in order to be used as a magnet. Such consolidation of the powdery substance can be achieved, as disclosed by Toepfer, et al., T. Speliotis et al. and H. Komura, et al., mainly by mixing with a binder, for example, an epoxy resin, whereby a bonded magnet is formed.

Reference Documents which have so far been cited and/or will hereinafter be cited are listed as follows:

<Patent Document 1>PCT Patent Application Laid-Open No. H9-501820
<Patent Document 2>Japanese Patent Application Laid-Open No. 2002-532047
<Patent Document 3>Japanese Patent Application Laid-Open No. H9-23771
<Patent Document 4>Japanese Patent Application Laid-Open No. H11-288812
<Non-Patent Document 1>Mitsubishi Electric Corp. Technical Report—Volume 75 (2001), pp. 703-708, by S. Ohta, T. Obara, Y. Toda and M. Takeda
<Non-Patent Document 2>Proceedings of the 18th International Workshop on High Performance Magnets and Their Applications, Annecy, France (2004), pp. 942-944, by H. Raisigel, O. Wiss, N. Achotte, O. Cugat and J. Delamare
<Non-Patent Document 3>Proceedings of the 18th International Workshop on High Performance Magnets and Their Applications, Annecy, France (2004), pp. 723-726, by M. Nakano, S, Sato, R. Kato, H. Fukunaga, F. Yamashita, S. Hoefinger and J. Fidler
<Non-Patent Document 4>Journal of the Magnetics Society of Japan—Volume 18 (1994), pp. 922-927, by T. Ito
<Non-Patent Document 5>Proceedings of the 18th International Workshop on High Performance Magnets and Their Applications, Annecy, France (2004), pp. 76-83, by D. Hinz, O. Gutfleisch and K. H. Muller
<Non-Patent Document 6>Proceedings of the 18th International Workshop on High Performance Magnets and Their Applications, Annecy, France (2004), pp. 767-778, by J. Delamare, G. Reyne and O. Cugat
<Non-Patent Document 7>Proceedings of the 18th International Workshop on High Performance Magnets and Their Applications, Annecy, France (2004), pp. 942-944, by Toepfer, B. Pawlowski, D. Scha and B. Bel
<Non-Patent Document 8>Materials for the 143rd Workshop of the Applied Magnetics Society of Japan, Surugadai Kinenkan of Chuo University (2005), by F. Yamashita
<Non-Patent Document 9>Journal of Applied Physics—Volume 101 (2007), 09K104, by H. Komura, M. Kitaoka, T. Kiyomiya and Y Matsuo With respect to the output of a micro rotary electric machine, a torque decrease due to volume reduction can be effectively supplemented by increasing rotational speed. However, an anisotropic magnet of, for example, D. Hinz, which has a remanence, Mr, of 1.2 T and an energy density (BH)max of 290 kJ/m$^3$ (refer to Non-Patent Document 5), can be radially magnetized with a level of remanence, Mr, maintained in a limited case of magnetization for one pole-pair, but can hardly be oriented in a case of radial multi-polar magnetization for four or more poles thus making it virtually impossible to produce. Consequently, the above magnet can hardly be applied to a radial gap type rotary electric machine which is favorable in terms of torque density or output characteristics and, in a case of multi-polar magnetization with two or more pole-pairs, can be used only as a rotor magnet for an axial gap type rotary electric machine especially.

The anisotropic magnet described above is favorable for increasing torque for an axial gap type rotary electric machine, but unfavorable for increasing rotational speed due to S-T (speed-torque) drooping characteristic. Besides, the magnet has an electric specific resistance of 10-5 Ωcm or less, and therefore loss due to eddy current increases even if rotational speed is increased. Such loss due to eddy current turns into heat energy thereby raising the temperature of the magnet, which results in decreasing static magnetic field (flux loss). Accordingly, an anisotropic rare earth magnet produced by die-upsetting or sintering, which is known to provide a high energy density (BH)max value, causes an increase in loss and a decrease in mechanical output power especially when used as a rotor magnet for a radial gap type micro rotary electric machine for a high speed rotation thus synergistically lowering the efficiency of the micro rotary electric machine. As described above, a well-known anisotropic magnet having a high (BH)max value is not optimum especially in terms of output and efficiency of a radial gap type micro rotary electric machine, which restricts the structural and electrical design freedom of the micro rotary electric machine.

In view of the above anisotropic magnet with a high remanence and a high (BH)max, Toepfer, T. Speliois, et al. propose a rotor with a bonded magnet which has an electric specific resistance of $10^{-1}$ Ωcm and a remanence, Mr, of 0.42 T, and thereby intend to restrain eddy current for the purpose of increasing rotational speed (refer to Non-Patent Documents 7 and 8). The remanence, Mr, of about 0.42 T, however, generates too low a static magnetic field to be used for a rotor magnet of a micro rotary electric machine, which results in insufficient torque.

On the other hand, with regard to multi-polar magnetizing a magnet for a micro rotor in the radial direction, for example, H. Komura, et al. report a multi-polar magnetization wherein a bonded magnet, which is made such that an isotropic $Nd_2Fe_{14}B$ powder made from a melt-spun thin ribbon is cured with epoxy resin and which has a remanence, Mr, of about 0.62 to 0.68 T, is heated up to 320° C. or higher and then cooled in the magnetic field system (Non-Patent Document 9).

Since the above compression-molded bonded magnet of H. Komura, et al. has an electric specific resistance of about 102 Ωcm, the problem associated with eddy current can be avoided, but the magnetic powder as a base constituent as well as the epoxy resin are inevitably degraded by heat during the multi-polar magnetization thus causing the magnetic potential to drop. Further, the bonded magnet is deteriorated in mechanical strength, which raises a major problem with reliability in resistance to centrifugal force at a high speed rotation, and the like. Moreover, the bonded magnet with a remanence, Mr, of 0.62 to 0.68 T produces too weak a static magnetic field for use as a rotor magnet of a micro rotary electric machine like the examples of Toepfer, et al, and T. Speliotis, et al., thus failing to obtain sufficient torque.

SUMMARY OF THE INVENTION

The present invention has been made in light of the problems described above, and it is an object of the present invention to provide a method of manufacturing a rotor magnet for a micro rotary electric machine, wherein the rotor magnet is isotropic, has a remanence, Mr, of 0.95 T or more, is radially magnetized with two or more pole-pairs so as to derive the potential of a material and suppresses eddy current resulting from a high speed rotation.

In order to solve the above problems, according to an aspect of the present invention, there is provided a method of manufacturing a rotor magnet for a micro rotary electric machine, which includes steps of: a process in which a plurality of thick films each made of nanocomposite texture composed of αFe and R-TM-B where R is either 10 to 20 atomic % Nd or 10 to 20 atomic % Pr, B is 5 to 20 atomic % and TM is either Fe or partly Co-substituted Fe with 0 to 16 atomic % are formed into a laminated magnet including isotropic nano-crystalline texture which contains an αFe layer and an $R_2TM_{14}B$ layer and which has a remanence, Mr, of 0.95 T or more; and a process in which the laminated magnet is multi-polar magnetized in-plane of the thick films.

In the aspect of the present invention, the αFe layer may have an average thickness of 60 nm or less and the $R_2TM_{14}B$ layer may have a thickness equal to or smaller than the average thickness of the αFe layer, and the αFe layer and the $R_2TM_{14}B$ layer may be deposited alternately in $10^3$ or more layers by using pulsed laser deposition.

In the aspect of the present invention, the αFe layer may have an average thickness of 60 nm or less and the $R_2TM_{14}B$ layer may have an average thickness of 5 to 20 nm, and wherein the αFe layer and the $R_2TM_{14}B$ layer may be deposited alternately in $10^3$ or more layers by using pulsed laser deposition.

In the aspect of the present invention, the laminated magnet fabricated from the thick films may be crystallized at 500 to 800° C. and then cooled at 500 to 310° C. during a cooling process in a multi-polar magnetic field system formed by a plurality of permanent magnets which are arranged regularly and which correspond in number to the number of pole-pairs, whereby all of the thick films of the laminated magnet are multi-polar magnetized in-plane.

According to the present invention, loss increase and output decrease due to eddy current can be restrained even if the number of pole-pairs is increased to thereby achieve a higher torque and the rotational speed is increased to thereby achieve a higher output in a radial gap rotary electric machine which is favorable in terms of torque density.

DETAILED DESCRIPTION OF THE INVENTION

Figure 1:
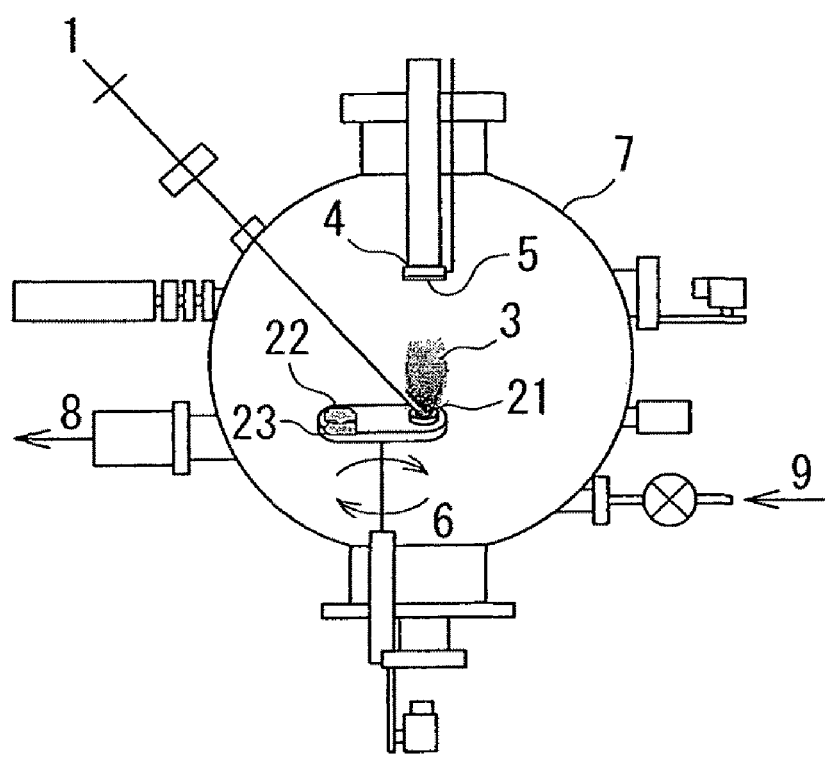
FIG. 1 is a schematic view of a relevant portion of a PLD apparatus.

The present invention will be described with reference to the accompanying drawings. Description will first be made on a magnetic potential of a thick film having nano-crystalline texture according to the present invention composed of αFe and $R_2TM_{14}B$ and made by using pulsed laser disposition (PLD) or strip cast method. In the description, the thick film is defined as a film having a thickness of about 50 μm or more.

For example, if a high saturation magnetization αFe to be exchange-coupled to a high coercive $R_2TM_{14}B$ is present, the αFe first undergoes magnetization reversal in a reverse magnetic field, which constitutes a major cause of decrease of the coercivity, HcJ, of the entire magnet. If the size of the αFe is set to the magnetic domain wall width or less, non-uniform magnetization reversal in the reverse magnetic field is reduced. As a result, the coercivity, HcJ, of the entire magnet is influenced by the magnetic anisotropy of the $R_2TM_{14}B$ and therefore is suppressed from decreasing. On the other hand, in order to achieve as high a magnetic flux as possible from αFe, the volume ratio of the αFe needs to be increased, and to this end the size of the $R_2TM_{14}B$ is to be minimized. The size of the $R_2TM_{14}B$ may also be set to the magnetic domain wall width or less, but since setting the size too small makes it difficult to maintain the coercivity, HcJ, the size is preferably set to approximately the magnetic domain wall width. The magnetic domain wall width is obtained by an expression: $\pi(A/K)1/2$ where A is an exchange stiffness constant and K is a magnetic anisotropic energy, and, in the case of applying a typical multi-layer structure with αFe and $Nd_2Fe_{14}B$, the αFe layer and the $Nd_2Fe_{14}B$ layer have a thickness of about 60 nm and several nm, respectively, by using a PLD method. Thus, the optimized thick film made by PLD according to the present invention is required to be structured such that an αFe layer and an R-TM-B layer are deposited alternately in $10^3$ or more layers wherein the αFe layer has an average thickness of 60 nm or less and the R-TM-B layer has a thickness equal to or smaller than the average thickness of the αFe layer. In this connection, the volume ratio fh of the $R_2TM_{14}B$, when the energy density (BH)max value is the largest, is given approximately by expression (1), and the energy density (BH)max value is represented by expression (2).

$$fh = \mu_0 Ms^2 / 4 Kh \qquad \text{<Expression (1)>}$$

$$(BH)max = \mu_0 Ms^2 / 4 Kh [1 - \mu_0(Ms-Mh)Ms/2 Kh] \qquad \text{<Expression (2)>}$$

In expression (1) and expression (2), Ms is a magnetization of the αFe, Kh is a magnetic anisotropic energy of the $R_2TM_{14}B$, and Mh is a magnetization of the $R_2TM_{14}B$.

While the $Nd_2Fe_{14}B$ magnet has a magnetic anisotropic energy, Kh, of about $10^7$ J/m$^3$, the αFe has a $\mu_0 Ms^2/4$ of about $10^6$ J/m$^3$. Accordingly, the $R_2TM_{14}B$ should have a volume ratio fh of about 10%. In this connection, the energy density (BH)max value is influenced mainly by the magnetization of the αFe, and quantitatively the $\mu_0 Ms^2/4$ is slightly corrected. Also, in expression (2), in the case of applying αFe and $Nd_2Fe_{14}B$, an energy density (BH)max value of 0.8 MJ/m$^3$ (100 MGOe) is expected to be achieved with fh=10%.

In order to obtain the energy density (BH)max value described above, the αFe and $Nd_2Fe_{14}B$ must have an adequate magnetic connection at their contact interface, and their thicknesses must be controlled to be about the domain wall width. According to an in-depth computer simulation, it is expected that with a uniform nanocomposite texture having a crystal grain diameter of about 10 mm, an anisotropic magnet achieves a (BH)max of 700 kJ/m$^3$, and an isotropic magnet achieves a (BH)max of about 300 kJ/m$^3$. While no such anisotropic magnets as described above have been practically available at this time, isotropic magnets intended for the embodiment of the present invention will achieve a (BH)max of up to about 200 kJ/m$^3$.

In this connection, Fe—B system also may be applied as one phase to constitute, together with $R_2TM_{14}B$, a nano-crystalline texture. The Fe—B system, however, has a saturation magnetization, Ms, of around 1.6 T which is about the same as that of the $R_2TM_{14}B$, and therefore the αFe, which is adapted to achieve a high remanence, Mr, and can be magnetized relatively easily, is suitable as a rotor magnet for the micro rotary electric machine according to the present invention. On the other hand, it is difficult to apply PLD to aαFe/R-TM-N (R is Sm and TM is Fe) system nanocomposite texture because of thermal decomposition of the nitride.

Description will now be made on manufacturing of the thick film according to the present invention in which nanocomposite textures artificially controlled are deposited alternately in $10^3$ or more layers.

In the embodiment of the present invention, nanostructure manipulation technology by PLD which enables a high speed deposition, as well as strip-casting method are employed. For example, when a nanocomposite texture film having a thickness of 0.1 mm is manufactured using films each having a thickness of 10 nm, $10^4$ of these films must be deposited. This manufacturing can be completed in about one hour by a PLD apparatus which has a pulse frequency of 30 Hz and which permits a deposition rate of 1 nm per pulse.

The optimized thick film containing the nanocomposite texture according to the present invention is structured such that an αFe layer and an R-TM-B layer (R is either 10 to 20 atomic % Nd or 10 to 20 atomic % Pr, B is 5 to 20 atomic %, and TM is Fe or partly Co-substituted Fe) are deposited alternately in $10^3$ or more layers wherein the αFe layer has an average thickness of 60 nm or less and the R-TM-B layer has a thickness equal to or smaller than the average thickness of the αFe layer. Preferably, the R-TM-B layer has an average thickness of 5 to 20 nm, and more preferably, both the αFe layer and the R-TM-B layer have an average thickness of 5 to 20 nm. For the purpose of improving the coercivity, HcJ, and the demagnetization curve squareness, Hk/HcJ, of the nano-crystalline texture, at least one of Al, Ti, V, Cr, Mn, Bi, Nb, Ta, Mo, W, Sb, Ge, Ga, Sn, Zr, Ni, Si, Zn and Hf may be added as needed. Also, when depositing the αFe layer and the R-TM-B layer alternately, a buffer of, for example, Ta may be formed.

The above thick film by the PLD can be manufactured in a vacuum of $10^{-6}$ Torr or less and at a deposition speed of 50 μm/h or more. Also, when depositing the αFe layer and the $R_2TM_{14}B$ layer alternately, the substrate temperature is preferably set at around the room temperature to thereby suppress the oxidization of the R-TM-B.

Two PLD targets, specifically an αFe target and an R-TM-B target are provided. The two targets may be separated or integrated. The thickness of each deposition layer is adjusted by controlling the rotation speed of the targets and the distance between the substrate and the targets. Also, the nanocomposite texture can be optimized by controlling the deposition ratio (corresponding to changing the average composition) and the thickness of each layer (corresponding to changing the relative strength of exchange interaction). Accordingly, the control of the nanocomposite texture by the PLD is far superior to the morphology control of the nanocomposite texture by the rapidly cooled and consolidated thin ribbon, such as melt-spun.

The above described technology of artificial manipulation of the nano-crystalline texture has virtually not been applied to the rotor magnet for a micro rotary electric machine which externally provides a static magnetic field required. This is because the magnet is an energy storing element and has been considered not to be produced by a bottom-up technique like film formation.

Description will next be made on the R-TM-B crystallization to be performed to obtain the nano-crystalline texture of αFe and $R_2TM_{14}B$ according to the present invention. The above thick film magnet having the nanocomposite texture according to the present invention is obtained by the amorphous thick film prepared from the strip-casting and/or the PLD method, and consequently the coercivity, HcJ, is not optimized. Therefore, a thick film magnet or a laminated thick film magnet is crystallized by heating thus forming the nano-crystalline texture composed of αFe and $R_2TM_{14}B$.

The R-TB-B is crystallized by heat treatment wherein the treatment temperature is set at or above the crystallization temperature of the $R_2TM_{14}B$, that is about 773 K (500° C.). If the treat temperature exceeds 1073 K (800° C.), the coercivity, HcJ, decreases rapidly due to the grain growth of the $R_2TM_{14}B$. Therefore, the treatment temperature is to be set between 773 K (500° C.) and 1073 K (800° C.), and preferably between 823 K (550° C.) and 923 K (650° C.) where disturbance in the laminate structure attributable to the diffusion during the heat treatment is slight and also where the R-TM-B is fully crystallized. In this connection, while the heat treatment holding time is not essential for the crystallization, it is desirable to rapidly heat up to the predetermined temperature and to rapidly cool down for the purpose of optimizing the nano-crystalline texture of the thick film to thereby increase the magnetic potential.

Description will then be made on multi-polar magnetization in the plane of the thick film including the isotropic nano-crystalline texture according to the present invention and also on eddy current of the laminated magnet fabricated from thick films such as multi-layered films. Through the crystallization by heat treatment, a laminated magnet with a predetermined dimension is obtained, which is composed of the above described thick film, or a circular or hollow circular thick film including the isotropic nano-crystalline texture according to the present invention. The heat treatment is conducted in an inert gas atmosphere or vacuum, wherein from between 500 and 310° C. during the cooling process, the thick film is appropriately multi-polar magnetized in the plane by means of the magnetic field produced by permanent magnets provided in a number corresponding to the number of pole-pairs and arranged regularly. The multi-polar magnetization in the plane means that the multi-polar magnetization is performed in a radial direction of the thick films.

When a part of Fe is Co-substituted, the Currie temperature increases by approximately 10° C. per atomic % Co. A temperature of 310° C. at the multi-polar magnetization in the plane is the Currie temperature Tc of the $R_2TM_{14}B$ (R=Nd or Pr). Also, when about 16 atomic % Fe is Co-substituted, the Currie temperature is about 470° C., and the upper limit of the temperature applied to the field is set to a temperature of 500° C. which is slightly higher than the aforementioned Currie temperature. The temperature of 500° C. corresponds to the crystallization temperature of the $R_2TM_{14}B$, and if the temperature applied exceeds 500° C., then crystallized $R_2TM_{14}B$ undergoes grain growth thus undesirably lowering the magnetic characteristics, such as the coercivity, HcJ, and the demagnetization curve squareness Hk/HcJ. In addition, if Co-substitution increases thereby decreasing the amount of Fe, the saturation magnetization Ms lowers significantly, and therefore, in the present invention, the upper limit of the amount of Co is set at 16 atomic % which allows the temperature coefficient of the remanence, Mr, at the Currie temperature Tc to be improved to about −0.07%/° C. while the level of saturation magnetization Ms is maintained.

On the other hand, the above thick film is not a bonded magnet and so has an electric specific resistance of about $10^{-5}$ Ωcm like a usual sintered or die-upset $R_2TM_{14}B$ magnet. In a micro rotary electric machine, in which the laminated magnet of thick films is multi-polar magnetized in-plane for a predetermined number of pole-pairs and a stator magnetic field generated mainly in the radial direction is utilized, an eddy current is adapted to be cut off by means of electrical resistance at the contact surface, even if insulation treatment is not applied to lamination plane (contact surface). Accordingly, even at a high speed rotation, eddy current loss, or flux loss due to self-heating of a magnet arising from eddy current can be reduced.

The present invention will be further detailed by way of embodiment examples. However, it is to be understood that the present invention is by no means limited to the specific embodiment examples. Description will first be made, with reference to the accompanying drawings, on manufacturing steps by PLD of a thick film containing the αFe/R-TM-B nanocomposite texture according to Embodiment Example 4 and also on the crystallization of the R-TM-B. FIG. 1 schematically shows a relevant portion of a PLD apparatus according to the present invention, wherein numeral 1 refers to a laser, and numerals 21, 22 and 23 refer to αFe, R-TM-B and Ta targets, respectively. The αFe, R-TM-B and Ta targets 21, 22 and 23 are disposed on a rotatable support board 6 and adapted to be irradiated by the laser 1 alternately when the support board 6 is rotated. Further, numeral 3 refers to a plume produced by atom (molecule) abrasion when the laser 1 is radiated on the αFe, R-TM-B and Ta targets 21, 22 and 23, and numeral 4 refers to an Fe substrate having a dimension of 25 mm×25 mm and a thickness of 10 μm. A masking with a throughhole having a diameter of 0.9 mm is disposed on a surface of the substrate 4. Numeral 5 refers to a thick film which has a diameter of 0.9 mm and which is formed such that the plumes 3 produced from the αFe target 21 and the R-TM-B target 22 are alternately deposited, with a Ta buffer layer provided, in $10^3$ or more layers on the surface of the substrate 4. The film formation was performed such that the pressure in a vacuum chamber 7 was set at $5\times10^{-7}$ to $2\times10^{-6}$ Torr by means of an exhaust system 8, and then that the YAG laser 1 having an energy of 340 mJ was radiated on the αFe target 21 or the R-TM-B target 22 at a pulse frequency of 30 Hz for 180 min. The thick film 5 resulting therefrom has a thickness of about 300 μm, which means about 1 nm deposition was obtained per pulse.

Figure 2A:
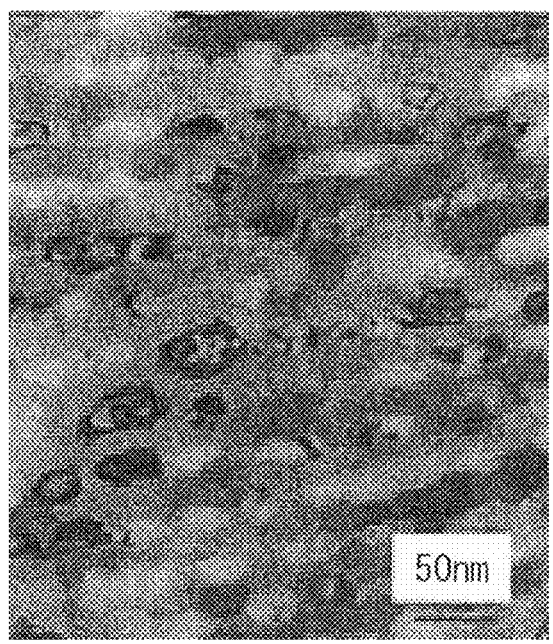
FIG. 2A is a transparent electron microscopic picture of a nano-crystalline texture.
Figure 2B:
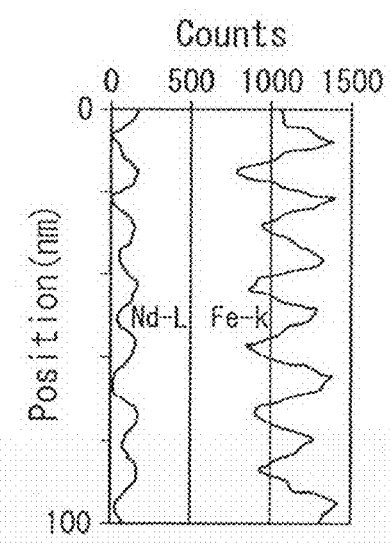
FIG. 2B is a characteristics chart showing distribution of Nd element and Fe element of the nano-crystalline texture.

Then, the above thick film 5 of the nanocomposite texture having a diameter of 0.9 mm was separated from the substrate 4, ten of the thick films 5 were stacked into a laminated magnet, and the R-TM-B was crystallized on the condition of a temperature rise rate of 150° C./min, a highest achieving temperature of 650° C. and no retention time. FIG. 2A transparent-microscopically shows the thick film 5, and FIG. 2B is a characteristics chart showing element distributions of Nd and Fe for 100 nm in a deposition direction. As clear from FIGS. 2A and 2B, the thick film 5 has a nanostructure where an Nd-rich zone and an Fe-rich zone are alternately arranged in an almost regular manner, which shows that the thick film 5 is the nano-crystalline texture where αFe and $Nd_2Fe_{14}B$ both having a thickness of about 10 to 15 nm are alternately arrayed.

Now, the magnetic characteristics of a rotor magnet having a diameter of 0.9 mm and a length of 3 mm according to the present invention will be explained together with other Embodiment Examples and also Comparative Examples. Table 1 is a characteristics list on rotor magnets for an axial gap motor which each have a diameter of 0.9 mm and a length of 3 mm and which include ten of the thick films according to the present invention stacked on one another, each of the thick films having an average thickness of 300 μm. In Table 1, figures in alloy composition are atom %, Embodiment Examples 1 to 3 are either αFe/$Nd_2Fe_{14}B$ or αFe/$Pr_2(Fe,Co)_{14}B$ which are each formed of rapidly cooled and solidified thin ribbons laser-cut into a diameter of 0.9 mm, while Embodiment Example 4 is a laminated magnet of thick films including αFe/$Nd_2Fe_{14}B$ nano-crystalline texture manufactured by the PLD. And the magnetization field Hm is 4 MA/m.

Comparative Examples 1 to 3 are bonded magnets formed such that an epoxy resin is mixed with powders obtained by crushing the crystallized rapidly cooled and solidified thin ribbons corresponding to Embodiment Examples 1 to 3, and then such that the mixtures obtained as described above are compression molded by a pressure of 1 Gpa into a diameter of 0.9 mm and a length of 3 mm. And, Comparative Example 4 is a compression molded single phase bonded magnet made of powder of the stoichiometric composition of $Nd_2Fe_{14}B$ under the same conditions as Comparative Examples 1 to 3. Referring to Table 1, when the remanence, Mr, of Comparative Example 4 ($Nd_2Fe_{14}B$ single phase bonded magnet) is defined as 1, the remanence, Mr, of Comparative Examples 1 to 3 including the αFe/$Nd_2Fe_{14}B$ nano-crystalline texture range only between 1.03 and 1.05. On the other hand, the remanence, Mr, of Embodiment Examples 1 to 3 ranges from 1.35 and up to 1.37, and the remanence, Mr, of Embodiment Example 4 which is a more preferable example reaches as high as 1.71. The remanence, Mr, attained here is 2.42 times as high as the remanence, Mr, of 0.42 T of the rotor magnet for the MEMS motor by Toepfer, T-Speliotis et al. (Non-Patent Document 7).

TABLE 1

| | Alloy composition | (BH)max kJ/m³ | Mr mT | HcJ kA/m |
|---|---|---|---|---|
| Embodiment Ex. 1 | $Nd_{10.5}Fe_{83.5}Co_{0.5}B_{5.5}$ | 135 | 960 | 565 |
| Embodiment Ex. 2 | $Nd_{10.5}Fe_{83.5}B_6$ | 135 | 950 | 533 |
| Embodiment Ex. 3 | $Pr_9Fe_{73}Co_9B_7V_1Nb_1$ | 135 | 950 | 645 |
| Embodiment Ex. 4 | αFe + $Nd_{14}Fe_{80}B_6$ | 90 | 1020 | 310 |
| Comparative Ex. 1 | $Nd_{10.5}Fe_{83.5}Co_{0.5}B_{5.5}$ | 83 | 740 | 549 |
| Comparative Ex. 2 | $Nd_{10.5}Fe_{83.5}B_6$ | 77 | 720 | 486 |
| Comparative Ex. 3 | $Pr_9Fe_{73}Co_9B_7V_1Nb_1$ | 80 | 730 | 626 |
| Comparative Ex. 4 | $Nd_{12}Fe_{77}Co_5B_6$ | 80 | 700 | 740 |

Figure 3:
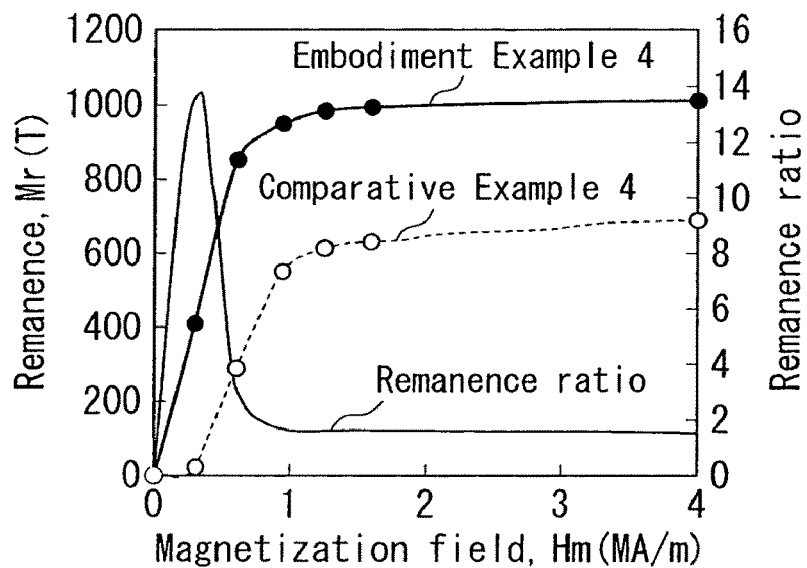
FIG. 3 is a characteristics chart showing variation of remanence, Mr, on examples with respect to magnetization field, Hm.

Embodiment Examples will further be described, with reference to Comparative Examples, with respect to the remanence, Mr, and the in-plane magnetization on the rotor magnet having a diameter of 0.9 mm and a length of 3 mm in no saturation magnetization region. FIG. 3 is a characteristics chart on Embodiment Example 4 showing variation of the remanence, Mr, relative to the magnetization field Hm and improvement of the remanence, Mr, at an arbitrary magnetization field Hm on the basis of Comparative Example 4. If the magnetization field Hm becomes below 4 MA/m which is near the saturation magnetization region, the remanence, Mr, of Embodiment Example 4 is 1.71 or more times superiorly as high as the remanence, Mr, of Comparative Example 4, and when the magnetization field Hm is 0.3 MA/m, Embodiment Example 4 has a remanence, Mr, which is about 14 times as high. Thus, the rotor magnet according to the present invention achieves a high remanence, Mr, and at the same time is adapted to cope with the magnetization deterioration which results from the miniaturization and multi-polar magnetization of a micro rotary electric machine.

Figure 4:
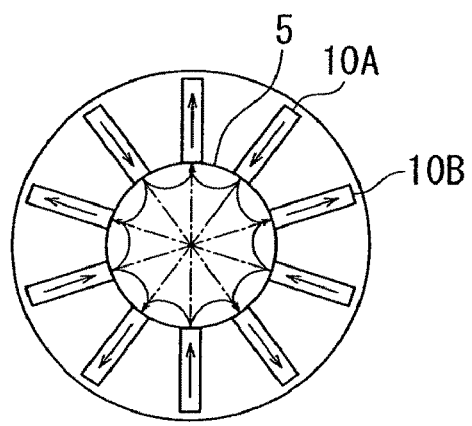
FIG. 4 is a schematic view of in-plane multipolar magnetization of an isotropic magnet by a high remanence with a cooling process implemented in a field formed by magnets.

The laminated magnet of Embodiment Example 4, which includes the nanocomposite texture according to the present invention and which has a diameter of 0.9 mm and a length of 3 mm, was made into a magnet of the αFe/$Nd_2Fe_{14}B$ nano-crystalline texture on the conditions of a temperature rise rate of 150° C./min, a highest achieving temperature of 650° C. and no retention time, and then, at a temperature of around 350° C. during the cooling process, was put in the field produced by ten permanent magnets 10A/10B arranged regularly as shown in FIG. 4, whereby the laminated magnet was cooled down in the multi-polar magnetic field. In FIG. 4, numeral 52 refers to a rotor magnet which is formed of ten of the thick films 5 laminated and which has a diameter of 0.9 mm, and the permanent magnets 10A and 10B are SmCo system sintered magnets having respective magnetization directions opposite to each other, whereby the ten thick films of the laminated magnet were multipolar magnetized in their planes.

Figure 5A:
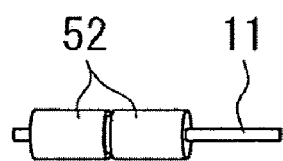
FIG. 5A is a perspective view of a rotor assembly according to the present invention.
Figure 5B:
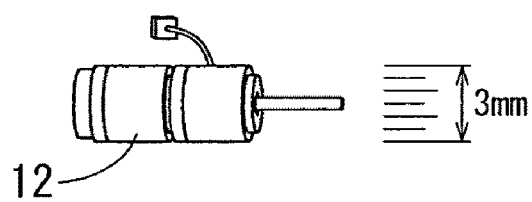
FIG. 5B is a perspective view of a rotary electric machine according to the present invention.

FIG. 5A shows a rotor assembly with ten magnetic poles, which includes two of the above described rotor magnets 52 with an inter-pole distance of 0.28 mm, and a shaft 11 having a diameter of 0.3 mm. FIG. 5B shows a radial gap motor which is built by combining the above rotor assembly with a stator assembly 12 having a diameter of 3 mm. The motor is a so-called stepping motor in which the rotor is rotated by one step angle (7.5 degrees) with a magnetomotive force of an exciting coil corresponding to one pulse current, and for example, a torque of 0.1 mNm or more is generated at 50 rps.

As described above, the micro rotary electric machine incorporating the rotor magnet according to the present invention can be used in various new applications, for example a motor adapted to output dynamic power and a generator adapted to produce electric power as a magnetic device in the so-called Power MEMS field.

The present invention can be used as a rotor magnet with multiple poles for a micro rotary electric machine.

What is claimed is:

1. A method of manufacturing a rotor magnet with at least two pole-pairs for a cylindrical radial gap micro rotary electric machine, the method comprising steps of:
   1) a process to form a laminated film magnet comprising isotropic nano-crystalline texture which contains an αFe phase and an $R_2TM_{14}B$ phase, where R is one of 10 to 20 atomic % Nd and 10 to 20 atomic % Pr, B is 5 to 20 atomic % and TM is one of Fe and partly Co-substituted Fe with 0 to 16 atomic %, and which has a remanence, Mr, of 0.95 T or more, the laminated film magnet being composed of a predetermined number of a plurality of thick films;
   2) a process in which the laminated film magnet is cylindrically formed; and
   3) a process in which the laminated film magnet is multi-polar magnetized in a radial direction of the thick films.

2. The method of manufacturing a rotor magnet with at least two pole-pairs for a cylindrical radial gap micro rotary electric machine according to claim 1, wherein the laminated film magnet fabricated from the thick films is crystallized at 500 to 800° C. and then cooled at 500 to 310° C. during a cooling process in a multi-polar magnetic field system formed by a plurality of permanent magnets which are arranged regularly and which correspond in number to a number of pole-pairs, whereby all of the thick films of the laminated film magnet are multi-polar magnetized in the radial direction of the thick films.

* * * * *